(12) United States Patent
Saeed et al.

(10) Patent No.: US 10,140,609 B2
(45) Date of Patent: Nov. 27, 2018

(54) INTEGRATED POINT OF SALE (POS) MOBILE DEVICE AND METHODS OF MANUFACTURE

(71) Applicants: Faisal Saeed, San Jose, CA (US); Zia Hasnain, San Jose, CA (US); Asif Rao, San Jose, CA (US)

(72) Inventors: Faisal Saeed, San Jose, CA (US); Zia Hasnain, San Jose, CA (US); Asif Rao, San Jose, CA (US)

(*) Notice: Subject to any disclaimer, the term of this patent is extended or adjusted under 35 U.S.C. 154(b) by 0 days.

(21) Appl. No.: 15/618,122

(22) Filed: Jun. 9, 2017

(65) Prior Publication Data

US 2018/0068300 A1   Mar. 8, 2018

Related U.S. Application Data

(63) Continuation-in-part of application No. 15/850,943, filed on Sep. 10, 2015.

(60) Provisional application No. 62/438,468, filed on Dec. 23, 2016.

(51) Int. Cl.
*G06K 15/00* (2006.01)
*G06Q 20/32* (2012.01)
*G07F 7/08* (2006.01)

(52) U.S. Cl.
CPC ..... *G06Q 20/3278* (2013.01); *G06Q 20/3227* (2013.01); *G07F 7/0886* (2013.01)

(58) Field of Classification Search
CPC ......... G06K 15/00; G06K 19/00; G06F 17/00
USPC .................. 235/383, 375, 487, 380
See application file for complete search history.

(56) References Cited

U.S. PATENT DOCUMENTS

| | | | | |
|---|---|---|---|---|
| 2013/0320088 A1* | 12/2013 | Lin | ...................... | G06K 7/0021 235/441 |
| 2014/0297540 A1* | 10/2014 | Swamy | ................ | G06K 7/0004 705/71 |
| 2016/0005020 A1* | 1/2016 | Fernando | ................ | G06F 3/048 705/21 |
| 2017/0018001 A1* | 1/2017 | Tunnell | .............. | G06Q 30/0255 |
| 2017/0140363 A1* | 5/2017 | Hicks | ................... | G06Q 20/208 |

* cited by examiner

*Primary Examiner* — Edwyn Labaze

(57) ABSTRACT

In one example aspect, an integrated point of sale (POS) mobile device includes a mobile-device processor; a secure payment processor; a memory, coupled to the mobile device-processor and the secure payment processor, for storing executable instructions that comprise a mobile-device payment system and a set of payment data; a glass film film (GFF) touch sensor, wherein the GFF touch sensor can be driven by a secure-touch integrated circuit (IC) that encrypts any touch data going to the secure payment processor; an EMV (Europay, MasterCard, and Visa) card reader system; an NFC (Near field communication) reader system; a Magnetic stripe reader (MSR); a housing comprising the mobile-device processor, the secure payment processor, the memory, the EMV (Europay, MasterCard, and Visa) card reader system, the NFC (Near field communication) reader system, the Magnetic stripe reader (MSR); a mobile-device payment system receiving input from the EMV card reader system, the MSR system, and the NFC reader system; and a security mesh comprising the secure payment processor.

6 Claims, 15 Drawing Sheets

INTEGRATED POINT OF SALE (POS) MOBILE DEVICE AND METHODS OF MANUFACTURE

CROSS-REFERENCE TO RELATED APPLICATIONS

This application claims priority to U.S. application Ser. No. 14/850,943, titled Smart integrated Point-of-sale System and filed on Sep. 10, 2015. This utility application is hereby incorporated by reference in its entirety. This application incorporates by reference in its entirety U.S. Provisional Patent Application No. 62/438,468, titled POINT OF SALE MOBILE DEVICE METHODS AND SYSTEMS and filed on 23 Dec. 2016.

BACKGROUND

1. Field

This description relates to the field of mobile devices and more specifically to sale integrated transaction mobile device.

2. Related Art

Currently in the market there are only products which incorporate payment methods (e.g. MSR, EMV, NFC, etc) in a jacket/sleeve designed to fit consumer phones such as iPhone. Similar sleeves are also available for scanner. Other companies have a scanner built with a cellular phone, However, this scanner looks like an external scanner. None of these products have a thickness less than fourteen millimeters (14 mm). Additionally, Current PoS systems on the market are bulky, take up large amounts of valuable countertop space, utilize outdated technology, consist of multiple separate attachments, and do not offer a modern look and feel. Moreover, current systems that have some modern took are not capable of accepting all forms of payments, and they are not able to provide valuable user experiences for customers, shop owners, and businesses. Therefore, there is a need to provide a complete end-to-end business management solution that comprises different hardware and software components to provide an integrated payment and customer experience solution.

BRIEF SUMMARY OF THE INVENTION

In one example aspect, an integrated point of sale (POS) mobile device includes a mobile-device processor; a secure payment processor; a memory, coupled to the mobile device-processor and the secure payment processor, for storing executable instructions that comprise a mobile-device payment system and a set of payment data; a glass film film (GFF) touch sensor, wherein the GFF touch sensor can be driven by a secure-touch integrated circuit (IC) that encrypts any touch data going to the secure payment processor; an EMV (Europay, MasterCard, and Visa) card reader system; an NFC (Near field communication) reader system; a Magnetic stripe reader (MSR); a housing comprising the mobile-device processor, the secure payment processor, the memory, the EMV (Europay, MasterCard, and Visa) card reader system, the NFC (Near field communication) reader system, the Magnetic stripe reader (MSR); a mobile-device payment system receiving input from the EMV card reader system, the MSR system, and the NFC reader system; and a security mesh comprising the secure payment processor.

BRIEF DESCRIPTION OF THE DRAWINGS

The present application can be best understood by reference to the following description taken in conjunction with the accompanying figures, in which like parts may be referred to by like numerals.

Figure 1:
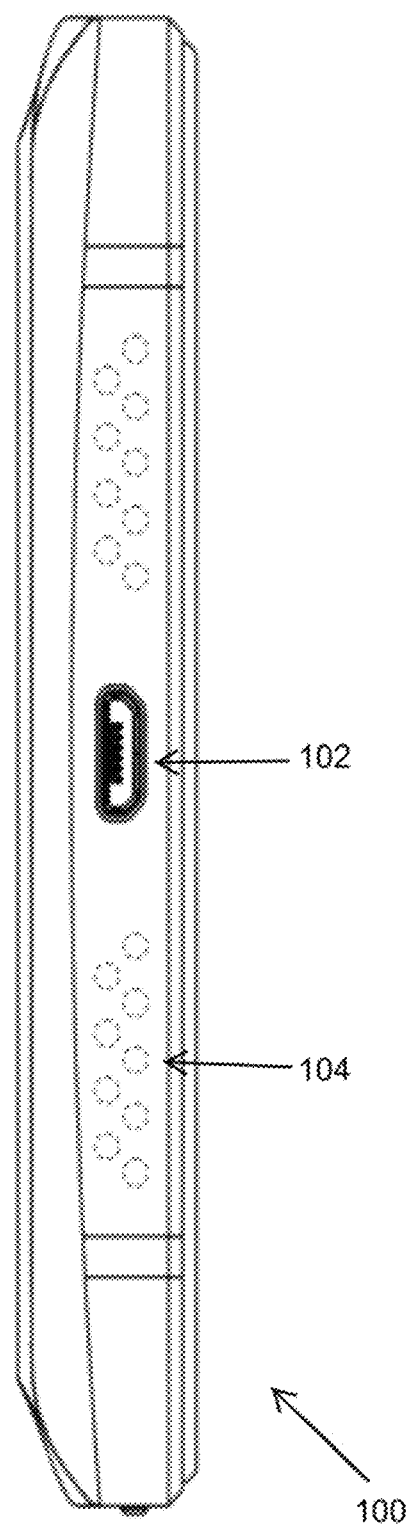
FIG. 1 is a perspective bottom view of a point-of-sale integrated transaction mobile device, according to some embodiments.

The figures described above are a representative set, and are not an exhaustive with respect to embodying the invention.

DETAILED DESCRIPTION

Disclosed are a system, method, and article of manufacture for an integrated point of sale (POS) mobile device and methods of manufacture. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

EMV is a technical standard for smart payment cards and for payment terminals and automated teller machines that can accept them.

Magnetic stripe reader (MSR) can be a device used to read magnetic stripe cards such as credit cards.

Mobile device can be a computing device has an operating system (OS) that can run various types of application software. A mobile device can be equipped with Wi-Fi, Bluetooth, NFC and GPS capabilities that can allow connections to the Internet and other devices, such as an automobile or can be used to provide location-based services. A camera or media player feature for video or music files can also be typically found on these devices along with a stable battery power source such as a lithium battery. A mobile device can also contain sensors like accelerometers, compasses, magnetometers, or gyroscopes, allowing detection of orientation and motion.

Near Field Communication (NFC) is a short-range wireless connectivity standard (e.g. Ecma-340, ISO/IEC18092) that uses magnetic field induction to enable communication between devices when they're touched together, or brought within a few centimeters of each other.

Personal identification number (FIN) is a numeric password used to authenticate a user to a system. PINs may be used with banking systems to authenticate the identity of the cardholder.

Pogo pin ca be a device used in electronics to establish a connection between two printed circuit boards. In some examples, a pogo pin takes the form of a slender cylinder containing two sharp, spring-loaded pins. Pressed between two electronic circuits, the sharp points at each end of the pogo pin make secure contacts with the two circuits and thereby connect them together.

Point-of-sale (PoS) can be the time and place where a retail transaction is completed. At the PoS, the merchant can calculate the amount owed by the customer and indicate the amount, and may prepare an invoice for the customer, and indicate the options for the customer to make payment.

Radio-frequency identification (RFID) can use electromagnetic fields to automatically identify and track tags attached to objects. The tags can contain electronically stored information. Passive tags collect energy from a nearby RFID reader's interrogating radio waves. Active tags have a local power source such as a battery and may operate at thousands of meters from the RFID reader.

Systems Overview

Embodiments of the present disclosure are directed to an all-in-one integrated PoS integrated transaction mobile device, related merchant services, as well as, other methods of use of said device. Generally, PoS integrated transaction mobile device is an electronic mobile device that can be connected to other devices or networks using various protocols such as Bluetooth, NFC, Wi-Fi, 2G/3G/4G, etc.

In some embodiments, PoS integrated transaction mobile device provides an interface to a merchant services backend, a backend system that serves a request by applying predefined business logic, a database system to store, retrieve, update, delete transaction information, a data warehouse to manage historic data derived from transaction information and other data management sources, payment backend, and a management console to provide visibility to management to monitor all activities, generate reports, and allow management to manually interact with the all-in-one smart integrated point-of-sale system to update and modify information based on business intelligence and data mining.

PoS integrated transaction mobile device 100 can implement payment methods in a secure manner that passes stringent certification requirements. For example, PoS integrated transaction mobile device 100 can include physical/mechanical protections such as, inter alia; tamper switches, security meshes, etc. PoS integrated transaction mobile device 100 can include various logical protections such as, inter alia: chip level encryption, encrypted card data from all payment methods and/or encrypted communication to the back end. These features are incorporated in a cellular phone form factor in PoS integrated transaction mobile device 100. PoS integrated transaction mobile device 100 design has all these protections to be incorporated into the form factor of a cellular phone and provides sleek designs around 14 mm or less in thickness. These and other advantages of the present technology are described herein with reference to the collective drawings.

FIGS. 1-6 illustrate various perspective views of a PoS integrated transaction mobile device 100. PoS integrated transaction mobile device 100 can include one or more processors (e.g., Intel® Atom® processor or any other tablet processor), a secure payment processor, and a main memory and static memory (collectively "memory"), which communicate with each other and any additional components via a bus.

PoS integrated transaction mobile device 100 may further include display(s), such as merchant display, at least one customer display, PoS integrated transaction mobile device 100 may also include an alpha-numeric or numeric input device(s) (e.g., a keyboard, keypad, touchscreen, numeric keypad), a weighing scale, biometric sensor(s) (e.g., fingerprint, voice recognition, face recognition, etc.), a scanner or barcode reader, at least one camera, and be communicatively coupled with a printer, PoS integrated transaction mobile device 100 can be connected to other devices or networks via Ethernet, Bluetooth Low Energy (BLE), Wi-Fi, Cellular data, such as 2G/3G/4G, and Bluetooth. Additionally, PoS integrated transaction mobile device 100 may include a signature display, a keypad, a magnetic stripe reader (MSR), an EMV (Europay, MasterCard, and Visa) card reader, NFC (Near field communication) reader, a drive unit (also referred to as disk drive unit), audio/microphone, GPS/gyroscope, I/O (Input/Output) Ports Hub, and ports. PoS integrated transaction mobile device 100 may further include a power integrated circuit (IC) that can manage the power supply to various components within PoS integrated transaction mobile device 100 and a data encryption module (not shown) to encrypt data.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, cellular data technologies like LTE, 2G/3G/4G, etc., or an IEEE 802.11-based radio frequency network.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, Customer Relationship Management (CRM) systems, Enterprise Resource Planning (ERP) systems, and the like, which may be utilized in order to implement any of the embodiments of the disclosure as described herein.

The present technology may be implemented as a web service in a secure cloud-based distributed scalable computing environment. A cloud-based computing environment is a resource that typically combines the computational power of a large grouping of processors and/or that combines the storage capacity of a large grouping of computer memories or storage devices sometimes distributed in different continents. For example, systems that provide a cloud resource may be utilized exclusively by their owners; or such systems may be accessible to outside users who deploy applications within the computing infrastructure to obtain the benefit of large computational or storage resources and may provide outside users access to larger audience.

The cloud back-end to support a PoS integrated transaction mobile device 100 may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

PoS integrated transaction mobile device 100 can mechanically isolate the payment and scanner functionalities into a separate payment module. The payment module incorporates the security features of PoS integrated transaction mobile device. The payment module design enables a USB connector and/or USB connection through pogo pins. This reduces the size and thickness of the connector.

More specifically, FIG. 1 is a perspective bottom view of PoS integrated transaction mobile device 100, according to some embodiments. PoS integrated transaction mobile device 100 can include speakers 104 and port 102. Port 102 can be a computer bus and/or power connector.

Figure 2:
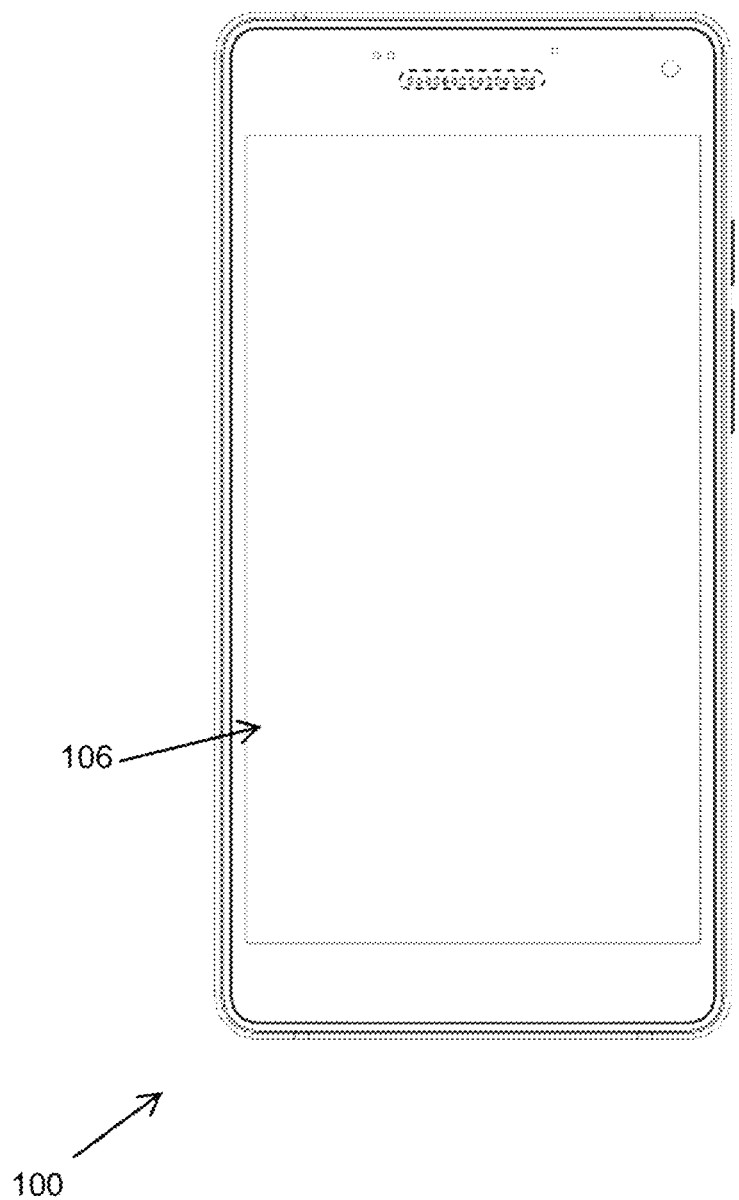
FIG. 2 is a perspective front view of a point-of-sale integrated transaction mobile device, according to some embodiments.

FIG. 2 is a perspective front view of PoS integrated transaction mobile device 100, according to some embodiments. PoS integrated transaction mobile device 100 can include touch-screen display 106. Touch-screen display 106 can be an input and output device normally layered on the top of an electronic visual display of an information processing system. A user can give input or control the information processing system through simple or multi-touch gestures by touching the screen with a special stylus and/or one or more fingers. Touch-screen display 106 can be used to access the functionalities of a mobile-device payment application. In this way, PoS integrated transaction mobile device 100 can used to manage payment services operated under financial regulation and performed from or via PoS integrated transaction mobile device 100.

Figure 3:
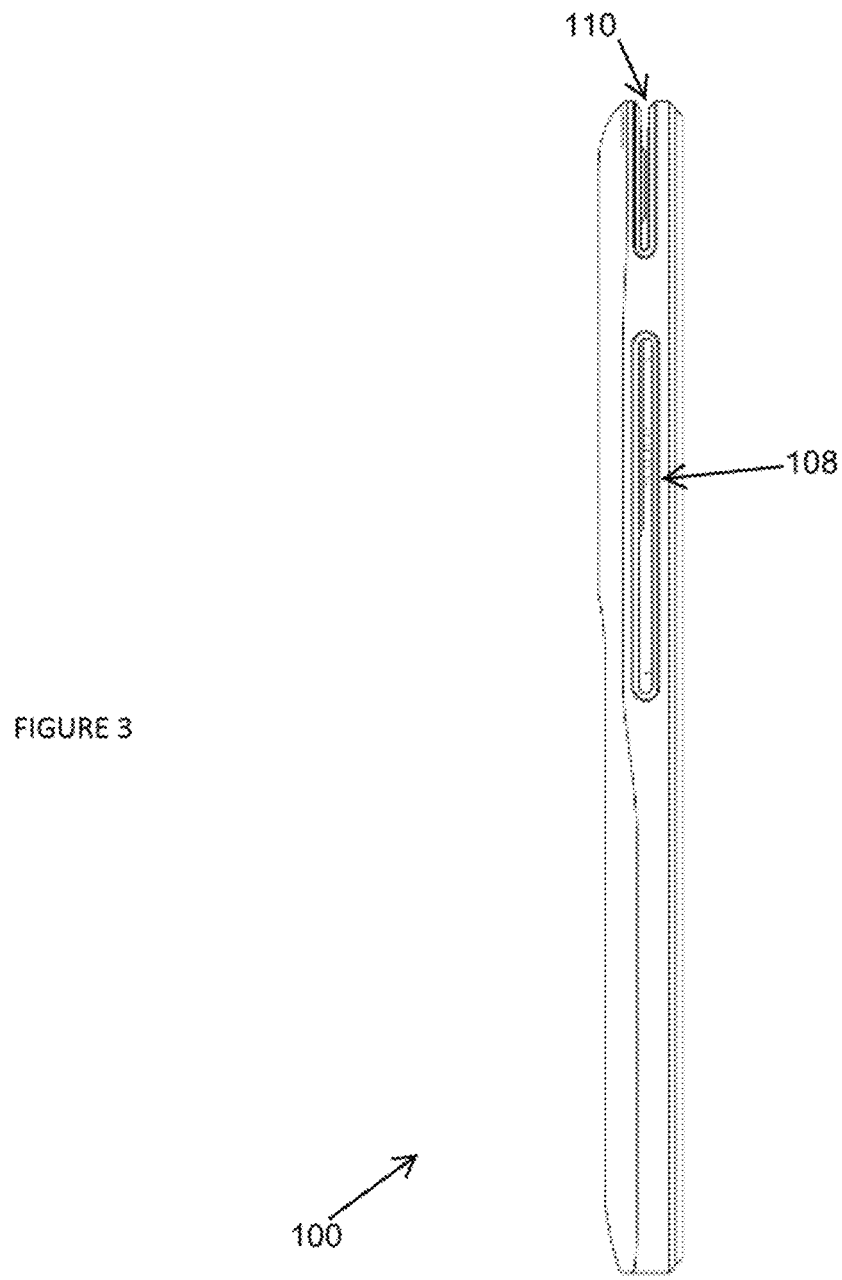
FIG. 3 is a perspective left-side view of a point-of-sale integrated transaction mobile device, according to some embodiments.

FIG. 3 is a perspective left-side view of PoS integrated transaction mobile device 100, according to some embodiments. PoS integrated transaction mobile device 100 can include MSR slot 110. MSR slot 110 can include a magnetic card reader that is a component of a payment module. The dimensions of the slot can be slightly larger than the thickness of a magnetic card (e.g. slightly greater than 0.76 mm as regulated by ISO/IEC 7810 or other international standards). PoS integrated transaction mobile device 100 can include EMV slot 108. EMV slot 108 can be slight larger than the portion of a credit card to be inserted in its chip reader portion (e.g. as defined by ISO/IEC 7810 or another international standard, etc.). Additional dimensions of various aspects of the payment module, MSR slot 110 and/or EMV slot 108 are provided infra according to some embodiments.

Figure 4:
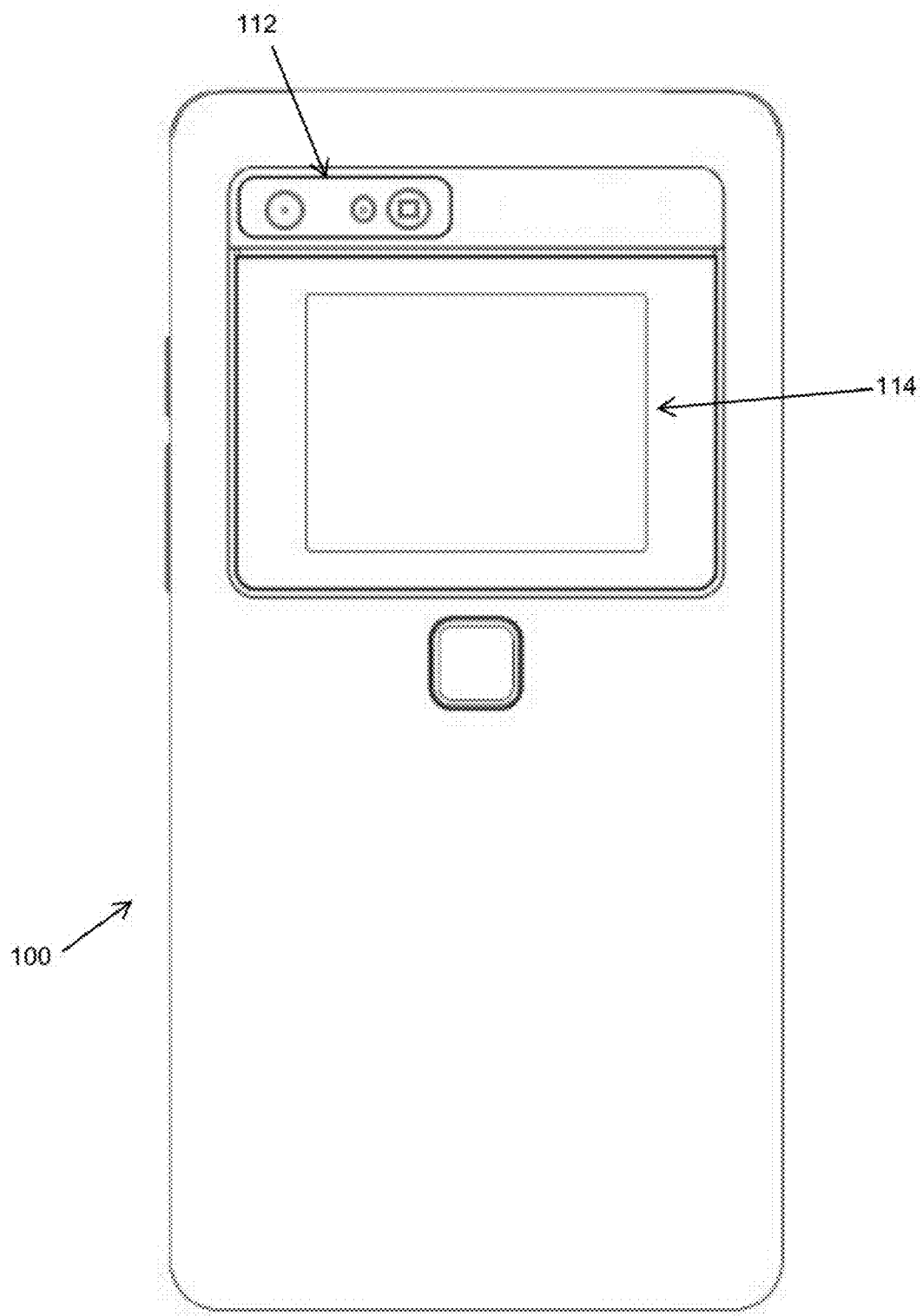
FIG. 4 is a perspective rear view of a point-of-sale integrated transaction mobile device, according to some embodiments.

FIG. 4 is a perspective rear view of PoS integrated transaction mobile device 100, according to some embodiments. As show in FIG. 4, PoS integrated transaction mobile device 100 can include digital camera(s) and/or scanners 112, digital camera(s) and/or scanners 112 can be utilized in various merchant activities and/or obtain information related to mobile-device transactions. PoS integrated transaction mobile device 100 can include a display 114. Display 114 can be used to implement a secure touch input system.

Figure 5:
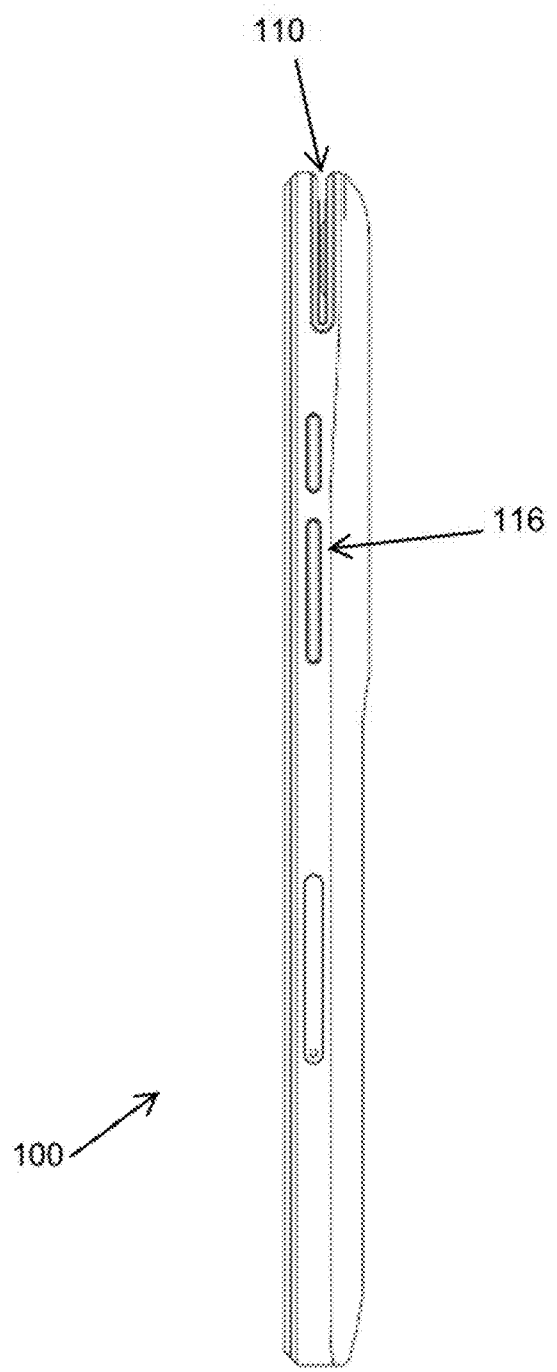
FIG. 5 is a perspective right-side view of a point-of-sale integrated transaction mobile device, according to some embodiments.
Figure 6:
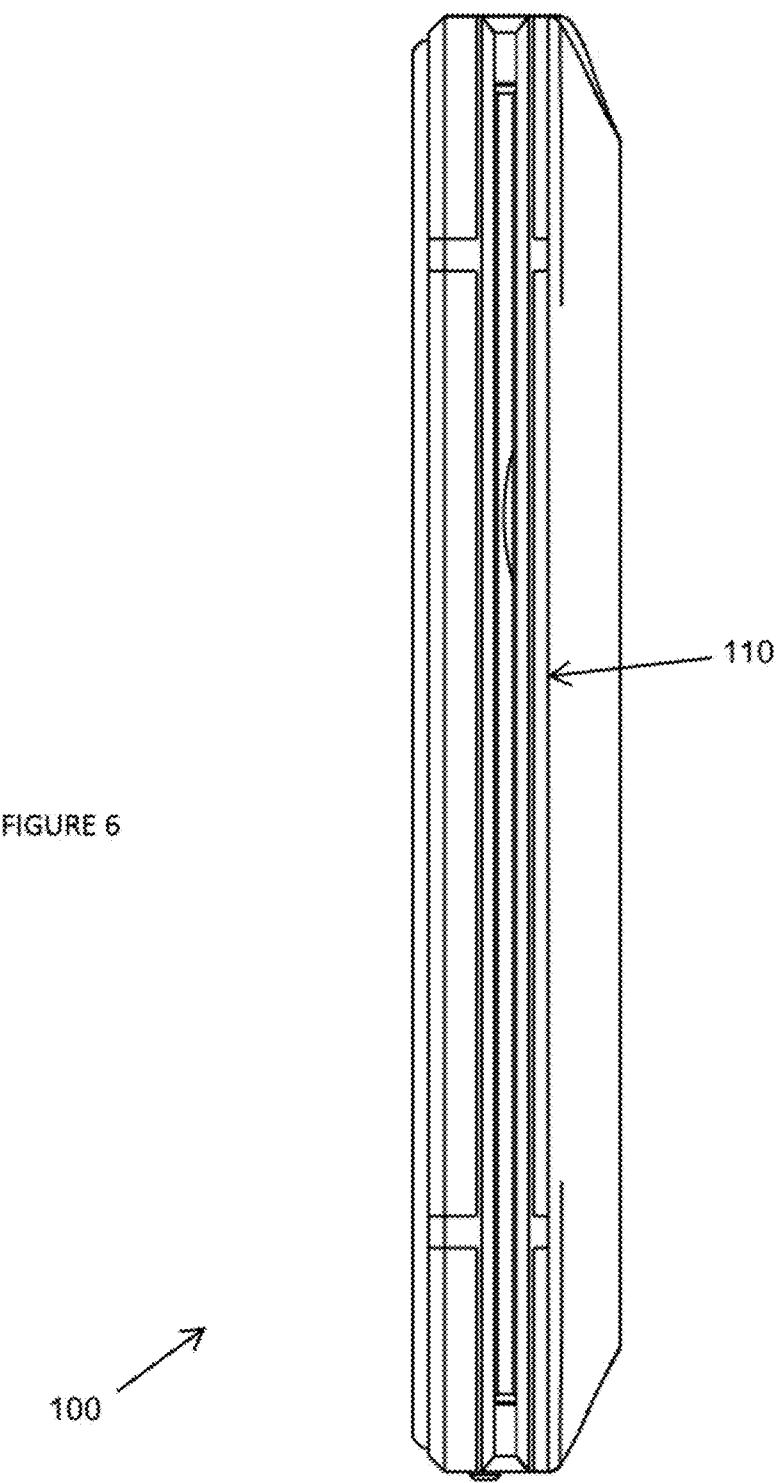
FIG. 6 is a perspective top view of a point-of-sale integrated transaction mobile device, according to some embodiments.

FIG. 5 is a perspective right-side view of PoS integrated transaction mobile device 100, according to some embodiments. As shown in FIG. 5, PoS integrated transaction mobile device 100 can include various control buttons 116 (e.g. power buttons, volume control buttons, etc.). FIG. 6 is a perspective top view of PoS integrated transaction mobile device 100, according to some embodiments. It is noted that the dimensions of PoS integrated transaction mobile device 100 are varied as shown in FIGS. 1-6. For example, FIGS. 1 and 6 are a close-up view of PoS integrated transaction mobile device 100 in order to illustrate additional details of MCR 110.

Figure 7:
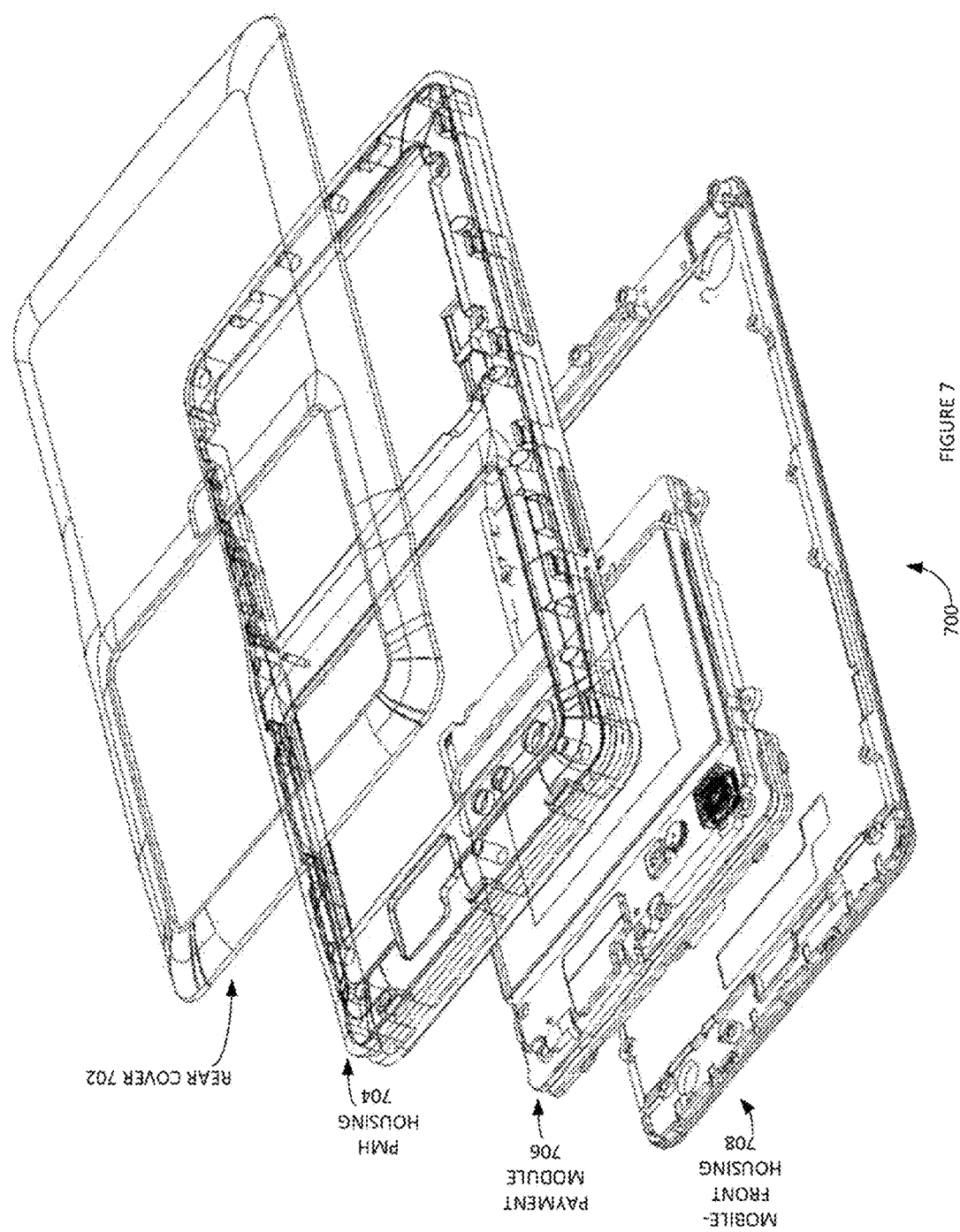
FIG. 7 illustrates a schematic illustration of an exploded view of component of a point-of-sale integrated transaction mobile device, according to some embodiments.

Referring now to FIG. 7, a schematic illustration of an exploded view of component of a PoS integrated transaction mobile device 700, according to some embodiments. Components of PoS integrated transaction mobile device 700 can include a rear cover 702, PMH housing 704, payment module 706 and mobile-front housing 708.

Rear cover 702 can encapsulate the exterior rear portion of mobile-device payment system 700. Rear cover 702 can coupled with PMH housing 704. PMH housing 704 is a plastic metal hybrid, to give a sturdiness to middle housing, PMH housing 704 can hold payment module 706 and mobile board.

Payment module 706 can include various payment systems such as MSR, EMV, NFC etc. As shown, the components of these systems can be formatted to fit into mobile-device payment system 100 size factor. Various figures provided infra include additional information regarding payment module 706.

Mobile-front housing 708 can have high resolution display and capacitive touch to provide sharp and crisp graphic contents and multipoint touch interface. The present technology is described above with reference to exemplary embodiments. Therefore, other variations upon the exemplary embodiments are intended to be covered by the present technology.

Figure 8:
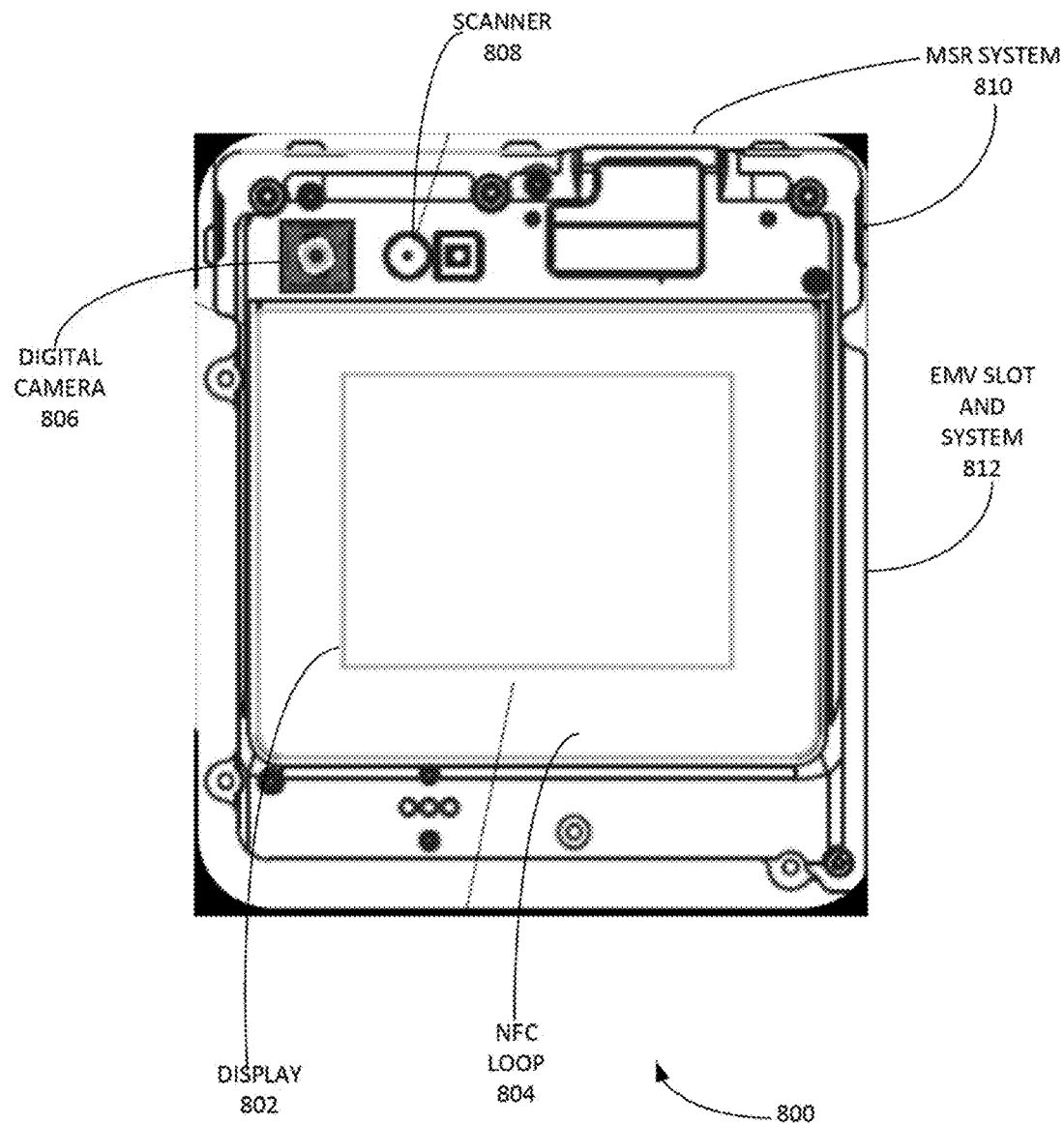
FIG. 8 illustrates an example payment module, according to some embodiments.

FIG. 8 illustrates an example payment module 800, according to some embodiments. Payment module contains a low power display 802. Display can include a secure touch input system. Secure touch input can be used for PIN entry and signature. NFC antenna loop 804 is just around the display 802. FIG. 8a illustrates an NFC antenna that can also be extended to a back cover to give more coverage to NFC. NFC is standard for two devices to communicate. NFC is used to make payment through mobile devices using Apple® pay, Samsung® pay, Android® pay, etc.

Scanner 808 and digital camera 806 can also be incorporated into payment module 800. Scanner 808 can be used for scanning items directly into a basket. A dedicated commercial grade scanner imager to scan items quickly and accurately. MSR system 810 (e.g. includes MSR slot 110) is at the top payment module 800 above scanner 808 and digital camera 806 in the present perspective. EMV system 812 (e.g. includes EMV slot 108) is on the right-hand side of the payment module 808 in the present perspective.

Figure 9A:
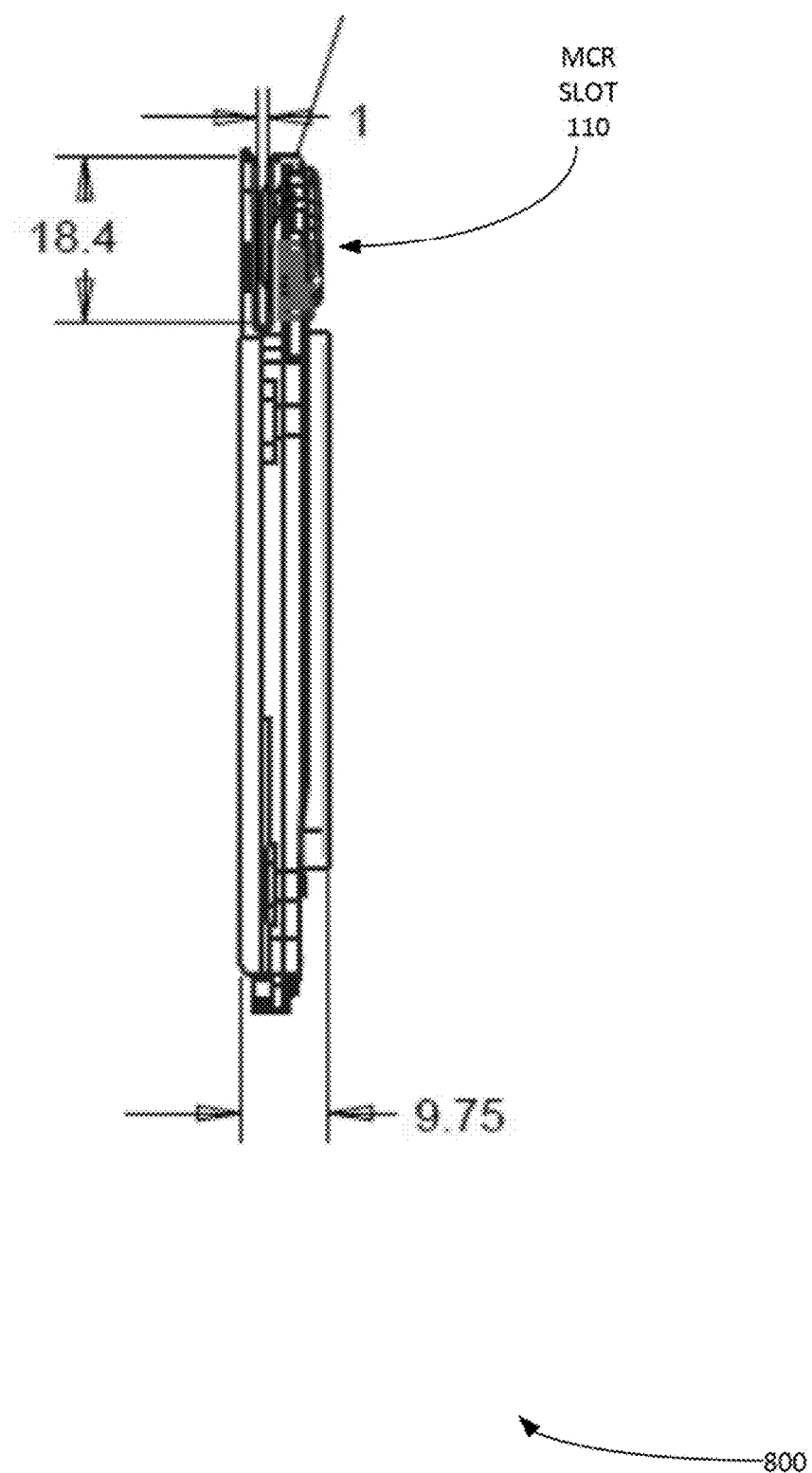
FIGS. 9 A-C illustrates a perspective side view of payment module, according to some embodiments.
Figure 9B:
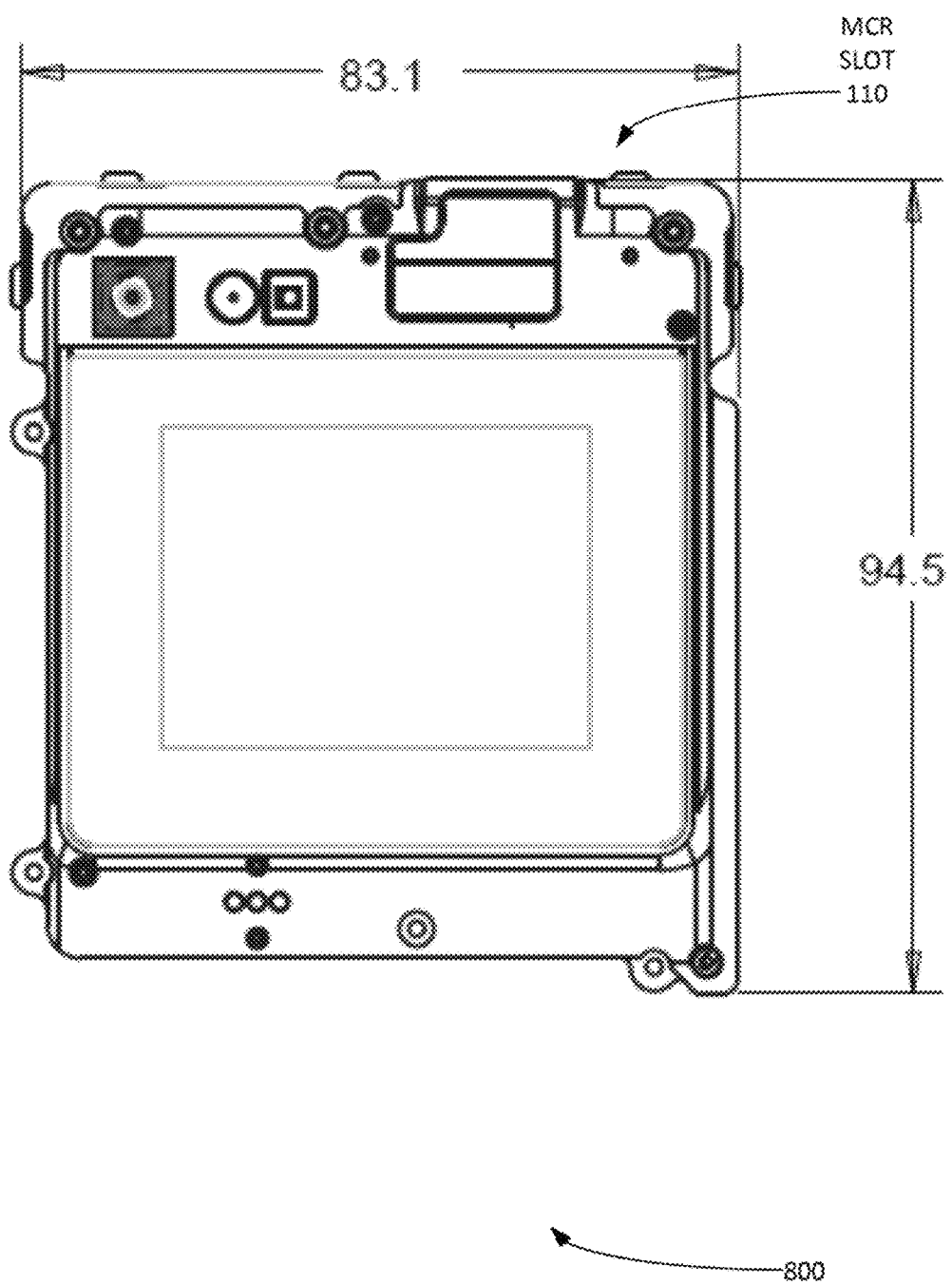
Figure 9C:
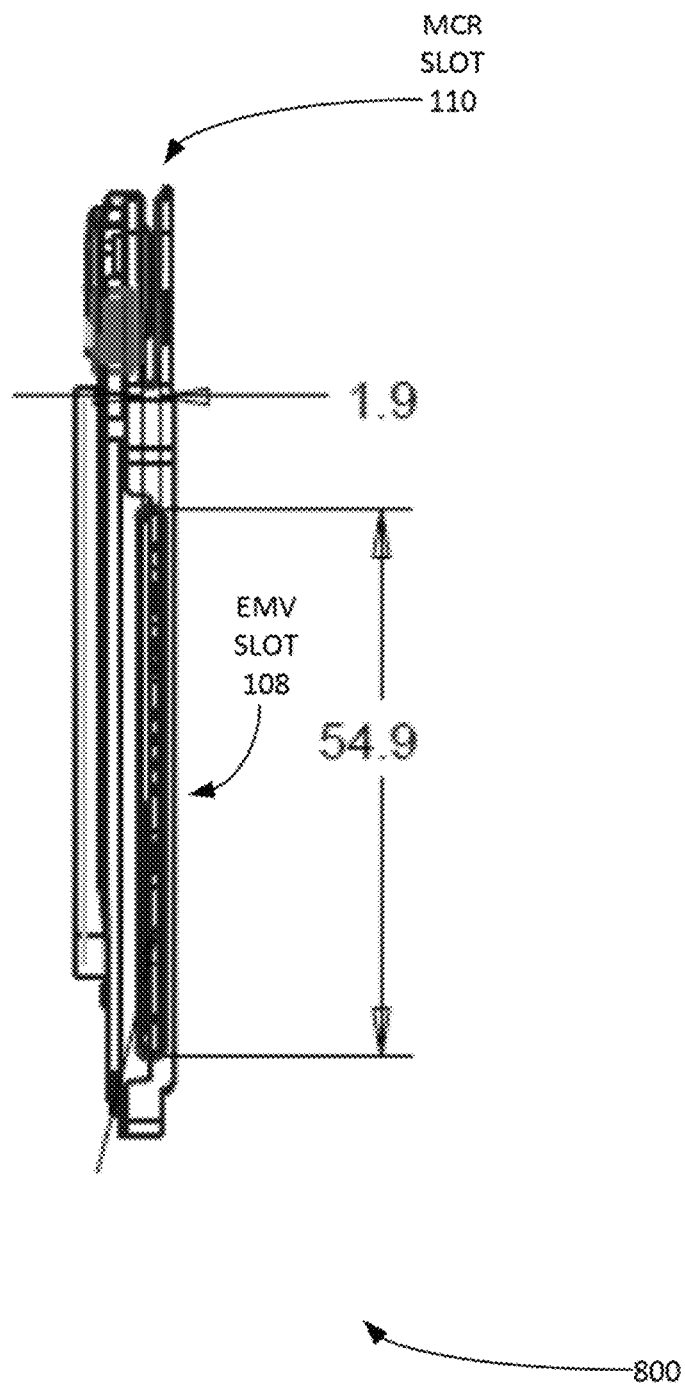
Figure 10:
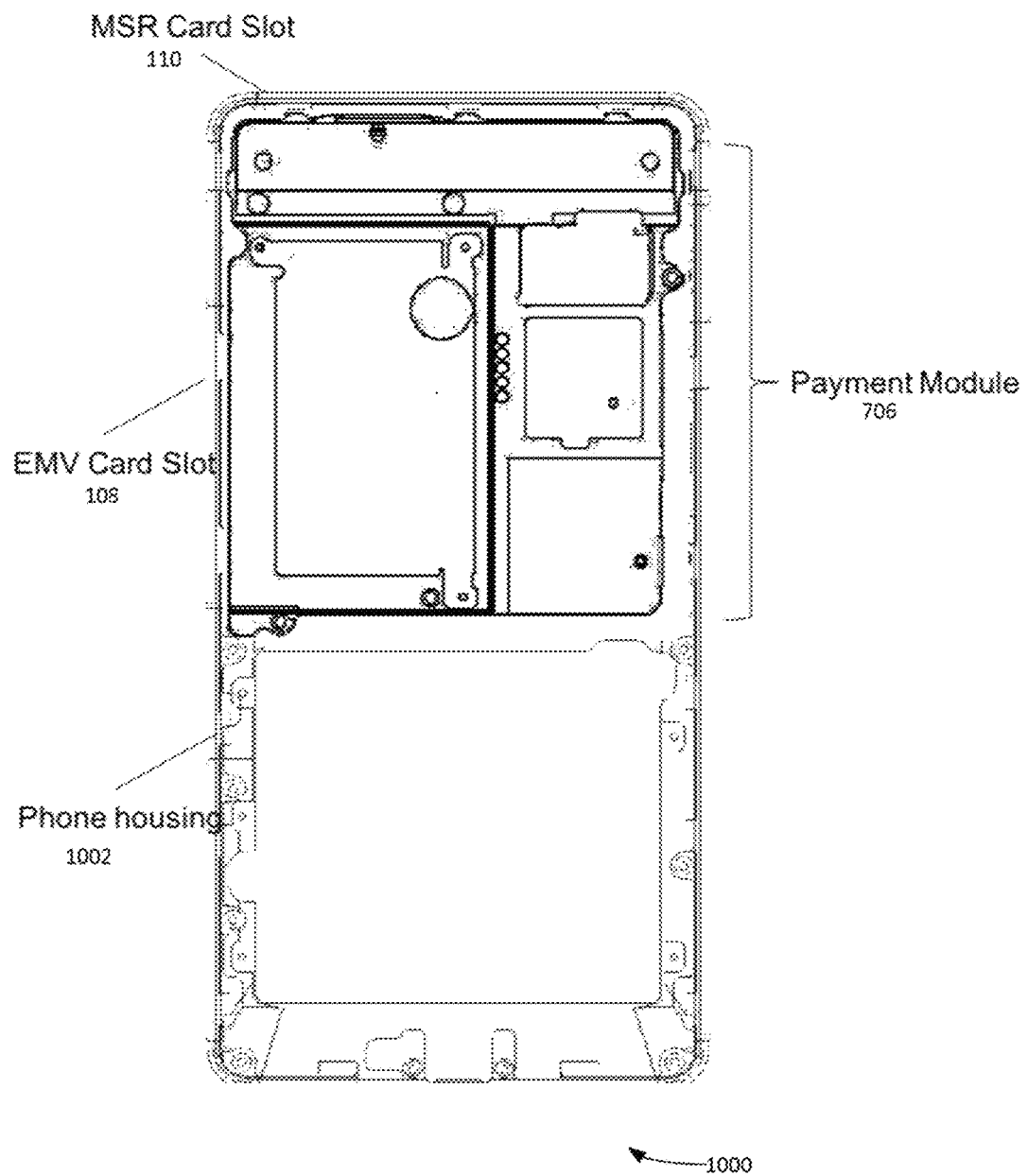
FIG. 10 illustrates an example view of payment module integrated into housing, according to some embodiments.

FIGS. 9A-C illustrates a perspective side view of payment module 800, according to some embodiments. FIGS. 9A-C illustrates example dimensions of payment module 800 as shown. These dimensions are provided by way of example and not of limitation. Dimensions are provided in millimeters (mm). FIG. 10 illustrates an example view of payment module 800 integrated into housing 708.

An example payment module is now described, according to some embodiments. Exploded view of payment module illustrates the stack up of the payment module. Starting from the top down, a first layer can be cover glass. The cover glass can have a glass film film (GFF) touch sensor on the back side. The GFF touch sensor can be driven by a secure touch IC which encrypts the touch data going to the payment processors. The display (e.g. display 106 discussed supra) can be directly laminated to glass. Under the cover glass and around the display can be the NFC Antenna loop. In some embodiments the NFC antenna loop is mounted or sit on the back cover. The various parts/components can be glued to the front housing. The payment board can contain the EMV card reader on the bottom side. Next to EMV card reader can be a payment processor. The EMV card reader and payment processor can be secured by a tamper-proof security mesh. The tamper-proof security mesh must be removed to access the card reader or the payment process. If it is cut, lifted and/or ripped the lines in the mesh break a circuit which joins to the payment process causing sensitive data to be erased immediately. On the top side of the board a second security mesh acts as a trigger when the housing is removed. There are features on underside of the front housing which press on domes in tamper-proof security mesh. When the housings are pried apart the domes are lift and break a circuit which also joins to the payment process and causes sensitive data to be erased. MSR head can be joined to the board which flexible connector which has similar security feature to EMV security mesh. The rear camera and the scanner are mounted on the rear housing with features which allow it to be connected to the mobile board.

When the payment module is assembled into a separate device, it has screws and tabs which allow it to be secured to the housing of the main device. There are also alignment features to ensure that the cosmetic parting line between the cover glass bezel and the main device are controlled tightly. Similar features are in place to align the MSR card slot and EMV card slot to the main device slots to ensure smooth travel of the card. The scanner and rear camera are also aligned with the main product openings. The net effect is a seamless transition and the appearance of one unified product for the customer.

The scanner and rear camera can be connected to mobile board through flexible connector (e.g. flex, etc.). Normally a separate scanner board is used to run the scanner, therefore they are usually a sleeve in the market or are thick and bulky. In contrast, some embodiments can incorporate scanner board components. Into the mobile board which allows scanner to be run by the mobile board. This reduces thickness of the product significantly.

The payment board has either gold plated pucks or a USB male connector. The mobile board is fitted with corresponding features, using either pogo pins or a USB female connector. The pogo pin design allows for a much smaller size and reduced thickness. There are features in the payment module to ensure proper alignment between the pogo pins and the puck.

FIG. 10 illustrates another example view of a payment module 706 in a sale integrated transaction mobile device 1000, according to some embodiments. FIG. 10 illustrates another view of how payment module 706 can be integrated into a phone housing (e.g. a housing of sale integrated transaction mobile device 1000, etc.).

Figure 11:
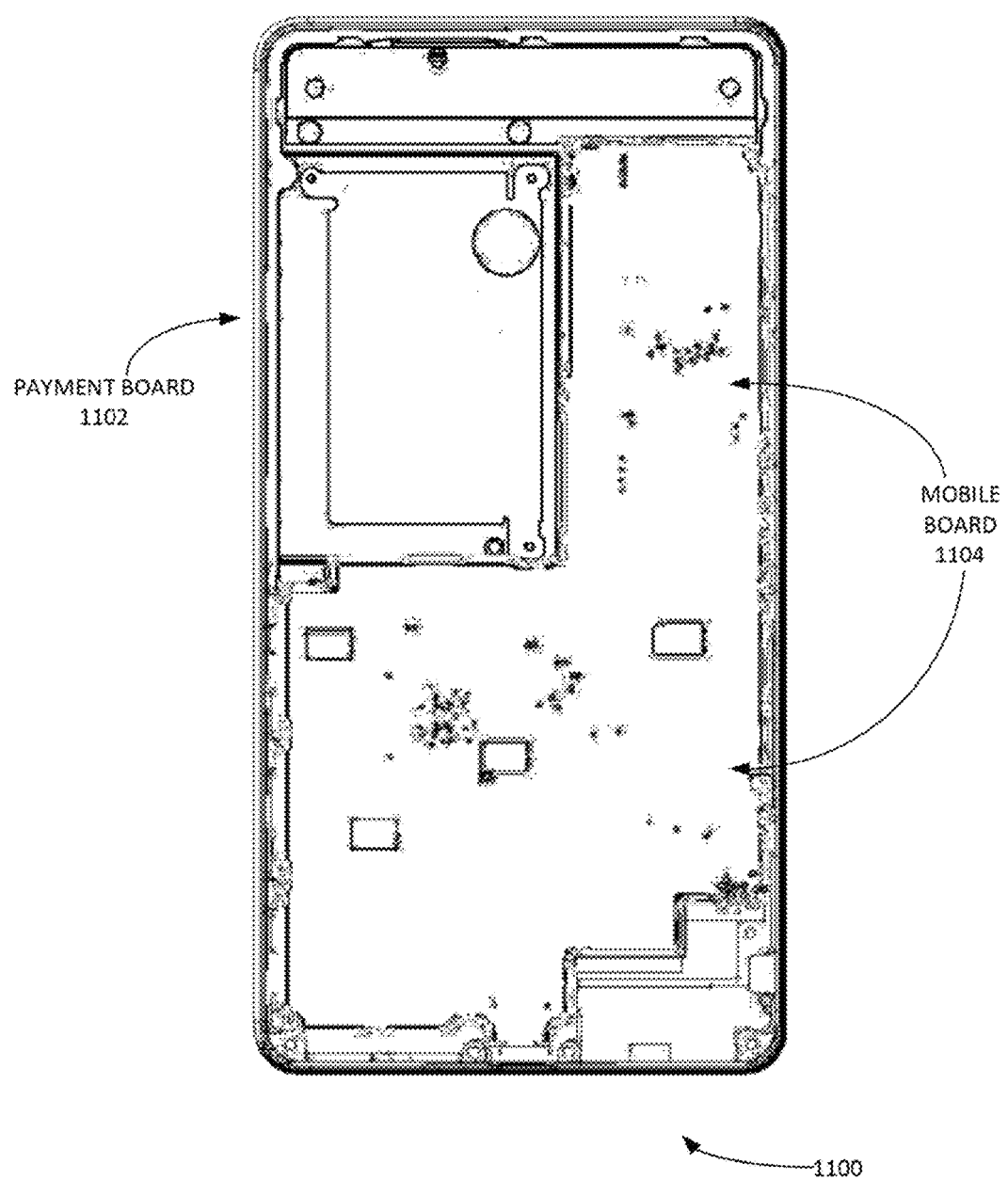
FIG. 11 illustrates an exploded view of payment module, according to some embodiments.

FIG. 11 illustrates another example view of a payment board 1102 integrated into a mobile board 1104 of a sale integrated transaction mobile device 1000, according to some embodiments. Payment board 1102 can be securely sit behind the Mobile board 1104. Payment boards are normally found outside the device and connected using USB or some other connector. Here payment board 1102 is uniquely fitted inside a mobile device form factor. Mobile board 1104 is placed in front of the payment board 1102 to provide complete smart phone functionality. Mobile board 1104 hosts all the POS applications, wireless network connectivity and all the features that are found in any typical smart phone in the market.

Figure 12:
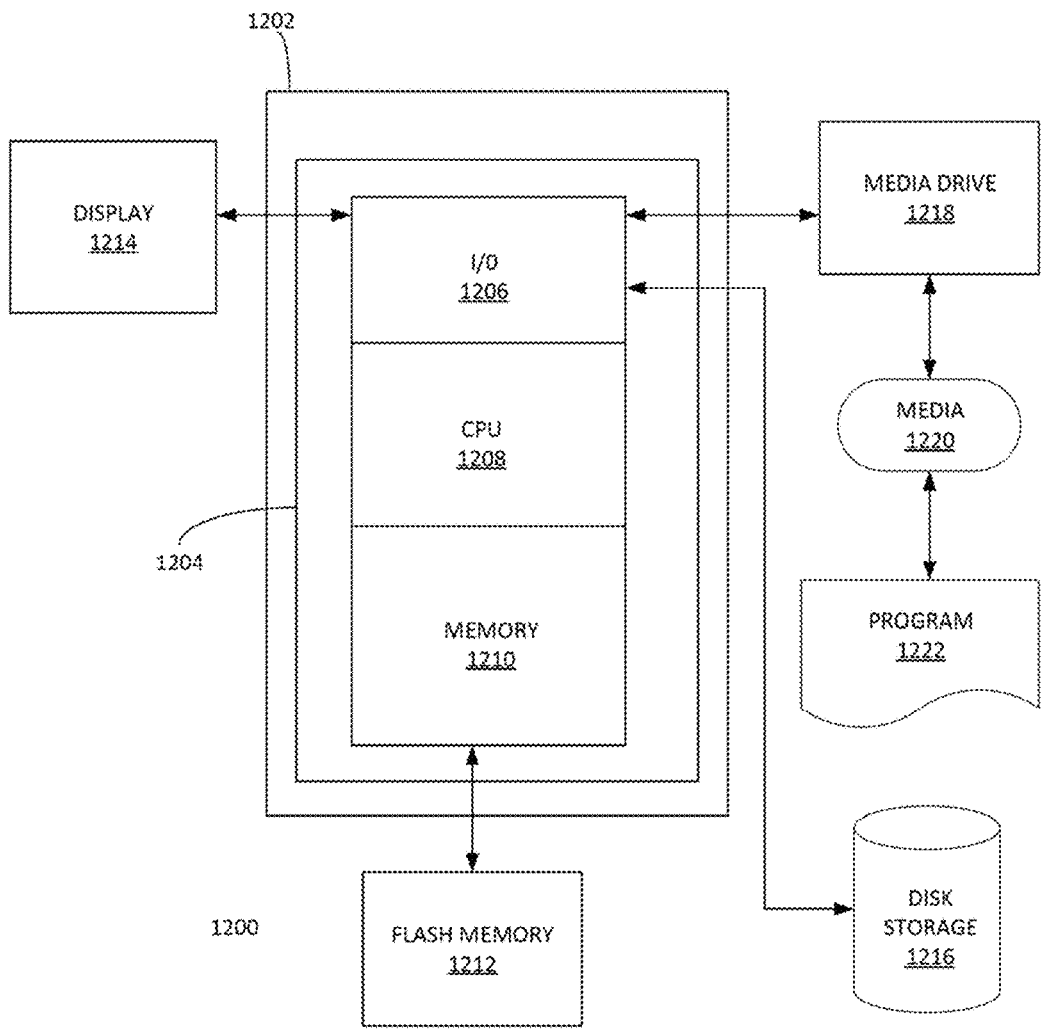
FIG. 12 depicts an exemplary computing system that can be configured to perform anyone of the processes provided herein.

FIG. 12 depicts an exemplary computing system 1200 that can be configured to perform anyone of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hard ware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having an I/O section 1206, one or more central processing units (CPU) 1208, and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a computer-read able medium 1220, which can contain programs 1222 and/or data. Computing system 1200 can include a web browser. Moreover, it is noted that computing system 1200 can be configured to include additional systems in order to fulfill various functionalities. Computing system 1200 can communicate with other computing devices based on various computer communication protocols such a Wi-Fi, Bluetooth® and/or other standards for exchanging data over short distances includes those using short-wavelength radio transmissions), USB Ethernet, cellular, an ultrasonic local area communication protocol, etc.

Figure 13:
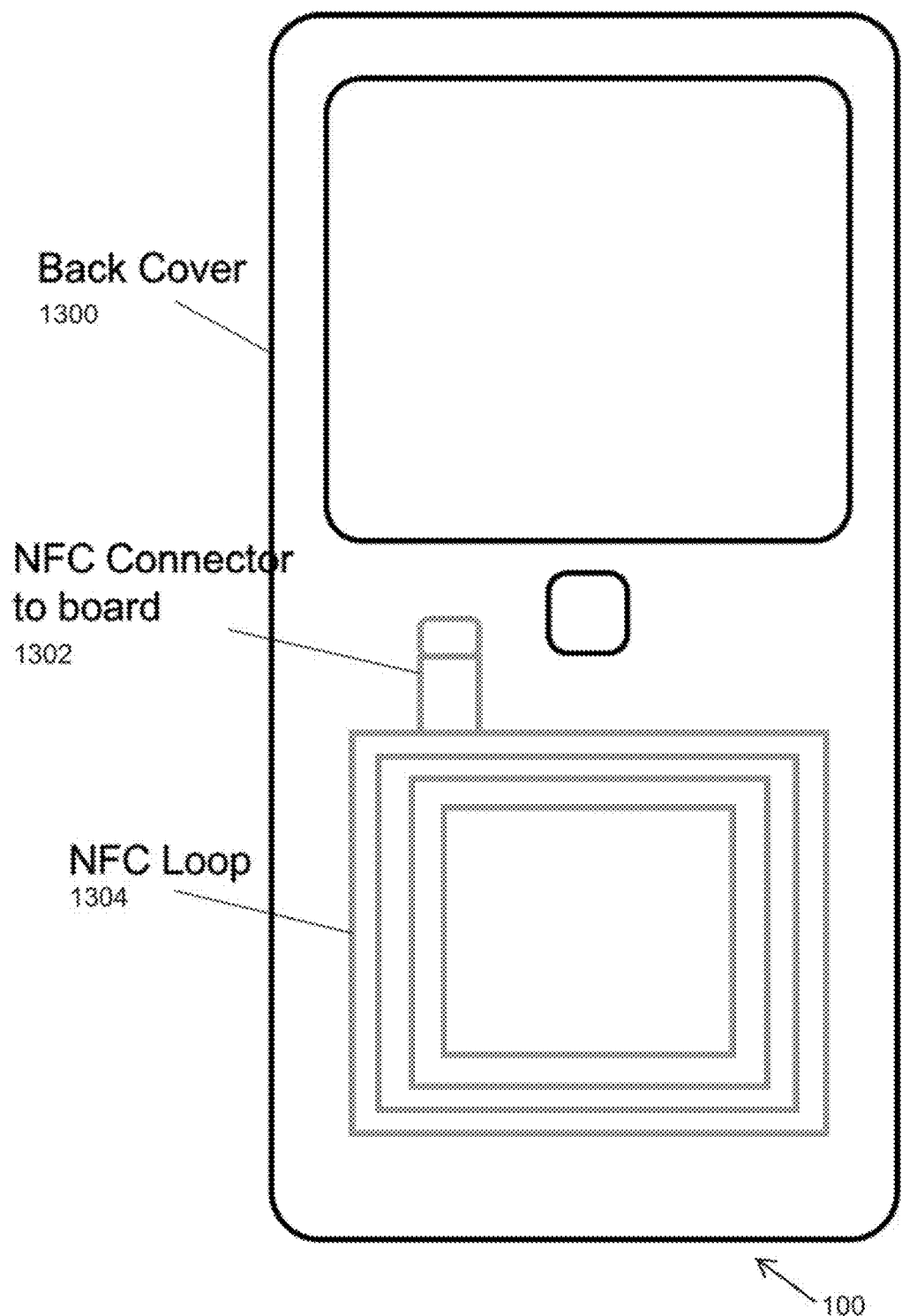
FIG. 13 illustrates a back-side view of PoS integrated transaction mobile device, according to some embodiments.

FIG. 13 illustrates a back-side view of PoS integrated transaction mobile device 100, according to some embodiments, PoS integrated transaction mobile device 100 can include back cover 1300. FIG. 13 also illustrates the placement of NFC connector to board 1302 and NFC loop 1304. It is noted that combines in one form factor various components such as various types of payment systems, a barcode scanner, a fingerprint sensor, an RFID system, etc. in a small mobile device form factor.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. An integrated point of sale (POS) mobile device comprising:
    a mobile-device processor;
    a secure payment processor;
    a memory, coupled to the mobile device-processor and the secure payment processor, for storing executable instructions that comprise a mobile-device payment system and a set of payment data;
    a glass film film (GFF) touch sensor, wherein the GFF touch sensor can be driven by a secure-touch integrated circuit (IC) that encrypts any touch data going to the secure payment processor;
    a cover glass over the GGF touch sensor;
    a display;
    under the cover glass and around the display, an NFC Antenna loop;
    an EMV (Europay, MasterCard, and Visa) card reader system;
    an NFC (Near field communication) reader system;
    a Magnetic stripe reader (MSR);
    housing comprising the mobile-device processor, the secure payment processor, the memory, the EMV (Europay, MasterCard, and Visa) card reader system, the NFC (Near field communication) reader system, the Magnetic stripe reader (MSR);
    an MSR card slot;
    an EMV card slot;
    a mobile-device payment system receiving input from the EMV card reader system, the MSR system, and the NFC reader system;
    a security mesh securing the secure payment processor and the EMV card reader such that the security mesh must be removed to access the EMV card reader or the secure payment processor, wherein the security mesh causes the memory to delete the payment data when a current passing through the security mesh is interrupted, and wherein any data related to the EMV card reader system, the NFC reader system, and the MSR system is deleted from the memory and the security payment processor when the current passing through the security mesh is interrupted.

2. The integrated PoS mobile device of claim 1 further comprising:
    a barcode scanner coupled to at least one of the processors.

3. The integrated PoS mobile device of claim 1 further comprising:
    a biometric verification unit coupled to at least one of the processors.

4. The integrated PoS mobile device of claim 3 further comprising:
    a payment board comprising the secure payment processor; and
    a mobile board.

5. The integrated PoS mobile device of claim 4; wherein the payment board and the mobile board are fitted with corresponding features using pogo pins.

6. The integrated PoS mobile device of claim 5, wherein payment board and the mobile board are fitted with corresponding features using a USB female connector.

\* \* \* \* \*